US006703890B2

United States Patent
Fukui

(10) Patent No.: US 6,703,890 B2
(45) Date of Patent: Mar. 9, 2004

(54) VOLTAGE SUPPLY CIRCUIT WITH PARASITIC OSCILLATION COMPENSATION

(75) Inventor: Eizo Fukui, Beppu (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/277,544

(22) Filed: Oct. 22, 2002

(65) Prior Publication Data

US 2003/0076697 A1 Apr. 24, 2003

(30) Foreign Application Priority Data

Oct. 22, 2001 (JP) ........................................ 2001-323724

(51) Int. Cl.$^7$ ............................................... G05F 3/02
(52) U.S. Cl. .......................................... 327/534; 363/59
(58) Field of Search ................................ 327/534, 535, 327/536, 537; 363/59

(56) References Cited

U.S. PATENT DOCUMENTS 6,353,361 B1 * 3/2002 Sun ............................. 330/253
6,456,151 B1 * 9/2002 Pontarollo ................... 327/536
6,456,513 B2 * 9/2002 Saito ............................ 363/59

\* cited by examiner

*Primary Examiner*—Terry D. Cunningham
(74) *Attorney, Agent, or Firm*—William B. Kempler; W. James Brady, III; Frederick J. Telecky, Jr.

(57) ABSTRACT

A voltage supply circuit in which parasitic oscillation of a charge pump driver circuit can be restrained, charge pump driving currents can be generated at a stable oscillation frequency, and a desired boosting voltage can be supplied to a load circuit. Because oscillation voltage $V_{OSC}$ having an oscillation frequency unique to a crystal oscillator is generated by oscillator circuit 10, charge pump driver circuit 20$a$ is provided with comparator CMP2 having a hysteresis characteristic, comparator CMP2 does not operate when output differential voltage $\Delta V_i$ of comparator CMP1 is lower than prescribed threshold $\Delta V_{th}$, and comparator CMP2 begins to operate when $\Delta V_i$ has exceeded threshold $\Delta V_{th}$ in order to generate driving currents $I_{S1}$ and $I_{S2}$ having the same frequency as that of the oscillation signal output by oscillator circuit 10 and supplies them to charge pump circuit 30, parasitic oscillation can be restrained, and driving currents having a desired frequency can be supplied to the charge pump circuit using a simple circuit configuration.

7 Claims, 4 Drawing Sheets

VOLTAGE SUPPLY CIRCUIT WITH PARASITIC OSCILLATION COMPENSATION

FIELD OF THE INVENTION

The present invention pertains to a charge pump booster circuit for supplying a voltage different from a source voltage and a voltage supply circuit containing a driver circuit for driving the charge pump booster circuit.

BACKGROUND OF THE INVENTION

Usually, a DC—DC converter equipped with a switching power source or a charge pump type booster circuit is used to generate a voltage having a level different from that of a source voltage. A voltage higher than the source voltage or a negative voltage can be generated using these circuits.

For example, the frequency range of the TV tuner of a TV receiver can be adjusted (tuning) by changing the tuning voltage applied to the variable capacitor (variable capacity element) of the voltage control oscillator circuit (VCO) according to the channel to be received. A voltage of 30 V or so may be needed for said tuning voltage depending on the frequency band of the signal received.

In recent years, TV tuners have been used widely for automobile TVs and personal computers (personal computer), for example, where compactness, light weight, and portability are often demanded. Thus, a system is needed in which the tuning voltage needed for the TV tuner is generated inside of the device instead of supplied from the outside. A charge pump booster circuit is widely utilized as a voltage generator circuit to this end.

FIG. 4 shows an example configuration of a popular charge pump type booster circuit. As illustrated, said booster circuit is configured with oscillator circuit 10, charge pump driver circuit 20, and charge pump circuit 30. Configurations of the respective partial circuits and their functions will be explained below.

As shown in the figure, oscillator circuit 10 is usually configured with crystal oscillator XTL, capacitor C1, and oscillation amplifier OSC.

Charge pump driver circuit 20 is configured with comparator CMP and buffers BUF1 and BUF2 which supply driving currents $I_{S1}$ and $I_{S2}$ to charge pump circuit 30 according to the output signal of comparator CMP.

Charge pump circuit 30 is configured with multi-stage diodes D1, D2, ..., Dn connected in series between source voltage $V_{CC}$ supplying terminal $T_1$ and output terminal $T_2$, multiple capacitors $C_{p1}$, $C_{p2}$, ... provided to serve as a charge pump, output capacitor $C_{OUT}$, and multi-stage Zener diodes ZD1, ..., ZDm connected in series between output terminal $T_{OUT}$ and ground potential GND.

Capacitors $C_{p1}$, $C_{p2}$, ... for the charge pump are connected to output terminals of diodes D1, D2, ... at one end, and their other ends are connected to output terminals of buffers BUF1 and BUF2 alternately.

FIG. 5 is a circuit diagram showing the internal configurations of oscillator circuit 10 and charge pump driver circuit 20.

As illustrated, oscillator circuit 10 is configured with crystal oscillator XTL, capacitor C1, and oscillation amplifier OSC; and oscillation amplifier OSC is further configured with npn transistors P3 and P4, capacitors C2 and C3, and resistor elements R1 through R6.

Crystal oscillator XTL and capacitor C1 are connected in series between oscillation signal output terminal $T_3$ and ground potential GND.

In addition, npn transistors P1 and P2 diode-connected between the feed line of source voltage $V_{CC}$ and node ND1 are connected in series.

In oscillation amplifier OSC, the base of transistor P3 is connected to terminal $T_3$, its collector is connected to ND1, and the emitter is grounded via resistor element R3. In addition, capacitors C2 and C3 are connected in series between terminal $T_3$ and ground potential GND, and the junction of capacitors C2 and C3 is connected to the emitter of transistor P3.

In addition, resistor elements R4 and R5 are connected in series between node ND1 and ground potential GND, the collector of transistor P4 is connected to node ND1, the base is connected to the junction of resistor elements R4 and R5, and the emitter is grounded via resistor element R6.

Oscillator circuit 10 with the configuration is oscillated at an oscillation frequency unique to crystal oscillator XTL, and oscillation voltage $V_{osc}$ is output from terminal $T_3$. In addition, the gain of said oscillator circuit is determined based on the capacitances of capacitors C2 and C3.

In charge pump driver circuit 20, the differential circuit comprising npn transistors P5 and P6 and the differential circuit comprising npn transistors P8 and P9 constitute comparator CMP shown in FIG. 4. In addition, pnp transistors Q1 and Q2 and npn transistors P11, P12, P13, and P14 constitute buffers BUF1 and BUF2, respectively.

In the charge pump driver circuit 20, comparator CMP compares oscillation voltage $V_{OSC}$ of terminal $T_3$ of oscillator circuit 10 and the base voltage of transistor P4, generates an oscillation signal according to the result of said comparison, and outputs it to buffers BUF1 and BUF2. As a result, charge pump driving currents $I_{S1}$ and $I_{S2}$ having inverted phases with respect to each other are output from buffers BUF1 and BUF2.

Driving currents $I_{S1}$ and $I_{S2}$ output from buffers BUF1 and BUF2 are output into capacitors $C_{p1}$, $C_{p2}$, ... provided in charge pump circuit 30. Thus, capacitors $C_{p1}$, $C_{p2}$, ... are discharged and recharged alternately repeatedly at charge pump circuit 30, so that a voltage higher than source voltage $V_{CC}$ is output to output terminal $T_{OUT}$. Furthermore, voltage $V_{OUT}$ of output terminal $T_{OUT}$ is smoothened by output capacitor $C_{OUT}$ and sustained at a desired voltage by multistage Zener diodes ZD1, ..., ZDm connected in series.

In the charge pump booster circuit, the number of boosting steps is decided according to source voltage $V_{CC}$ and desired output voltage $V_{OUT}$. Furthermore, in general, the number of boosting steps is set so as to supply a boosted voltage higher than desired output voltage $V_{OUT}$ in order to assure sufficient current driving performance for a load circuit, and the current driving performance of the boosting circuit can be assured by regulating output voltage $V_{OUT}$ at a desired voltage value.

In the conventional charge pump type booster circuit, another feedback loop is formed in charge pump driver circuit 20 via the source impedance in addition to the feedback loop of oscillator circuit 10. In particular, when the impedance of the source line is high, parasitic oscillation is induced by the feedback loop of charge pump driver circuit 20. As a result, oscillator circuit 10 can no longer perform a normal oscillation operation, and the frequencies of the driving currents output from buffers BUF1 and BUF2 are determined by the oscillation frequency of the parasitic oscillation.

Normally, the oscillation frequency of oscillator circuit 10 is controlled by the frequency unique to crystal oscillator XTL. Because the buffers and charge pump circuit 30 are designed in accordance with the oscillation frequency of the oscillator circuit and the oscillation frequency of the parasitic oscillation is determined based on the characteristic of the feedback loop which induces the parasitic oscillation, the parasitic oscillation is considered to oscillate at an oscillation frequency different from the oscillation frequency of the crystal oscillator XTL. Thus, sufficient current can no longer be supplied to charge pump circuit 30, or the frequency of the driving currents becomes either lower or higher than the reference value required by charge pump circuit 30, and voltage $V_{OUT}$ output from charge pump circuit 30 cannot reach the desired voltage, resulting in a disadvantage that the desired current cannot be supplied to the load circuit.

The present invention was created in the light of such situation, and its objective is to present a voltage supply circuit by which the parasitic oscillation of the charge pump driver circuit can be restrained, the charge pump driving currents can be generated at a stable oscillation frequency, and a desired boosting voltage can be supplied to the load circuit.

SUMMARY OF INVENTION

In accordance with one aspect of the present invention, the voltage supply circuit of the present invention has an oscillator circuit which outputs an oscillation signal having a prescribed frequency, a first comparator circuit which compares the oscillation signal with a prescribed reference signal and outputs a signal in accordance with the result of said comparison, a second comparator circuit which sustains its output at a prescribed level when the amplitude of the output signal of the first comparator circuit is lower than a prescribed value and outputs a signal in accordance with the output signal of the first comparator circuit when the output signal of the first comparator circuit has exceeded the reference value, a buffer circuit which outputs a first driving current and a second driving current having inverted phases with respect to each other according to the output signal of the second comparator circuit, and a charge pump circuit having multiple capacitors to be charged alternately by the first and the second driving currents and which outputs a voltage different from a source voltage.

In addition, in another aspect of the present invention, ideally, the oscillator circuit has a crystal oscillator, generates the oscillation signal with a frequency unique to said crystal oscillator, and outputs it to the first comparator circuit.

In addition, in a further aspect of the present invention, ideally, the first comparator circuit is configured with a differential circuit in which the oscillation signal is input to an input terminal provided on one side, and the reference signal is input to an input terminal provided on the other side.

Furthermore, in yet another aspect of the present invention, ideally, the second comparator circuit is configured with a differential circuit having a hysteresis characteristic.

REFERENCE NUMERALS AND SYMBOLS AS SHOWN IN THE DRAWINGS

In the figures, 10 represents an oscillator circuit, 20, 20a a charge pump driver circuit, 30 a charge pump circuit, $V_{CC}$ the source voltage, and GND the ground potential.

DESCRIPTION OF THE EMBODIMENT

Figure 1:
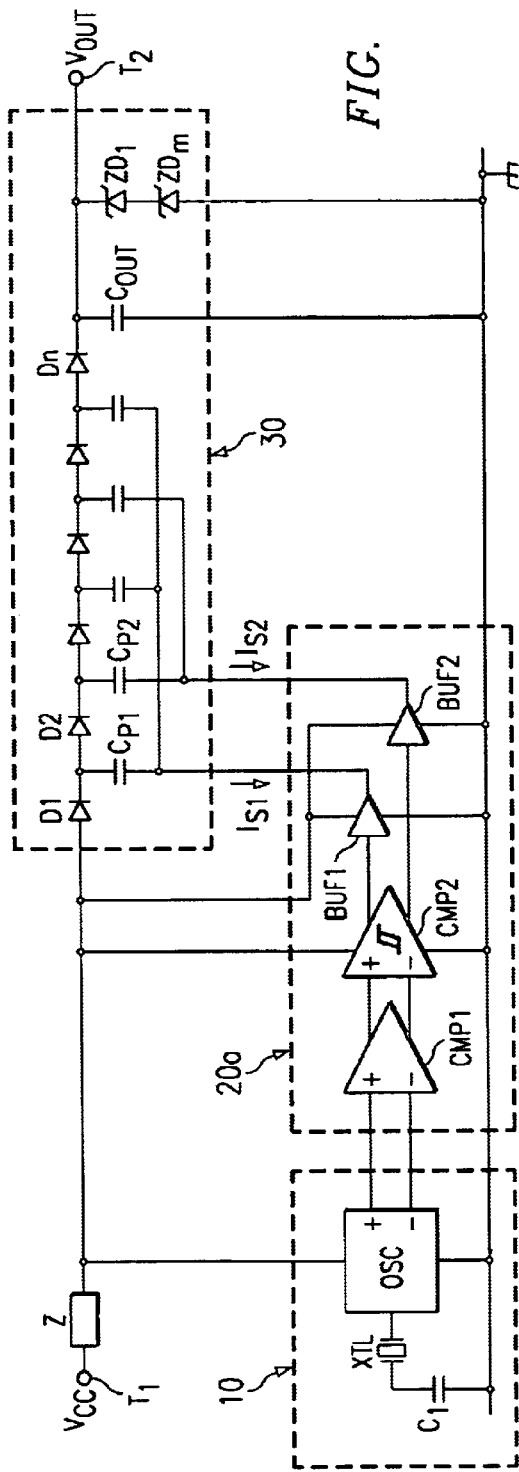
FIG. 1 is a circuit diagram showing an embodiment of the voltage supply circuit pertaining to the present invention.
Figure 4:
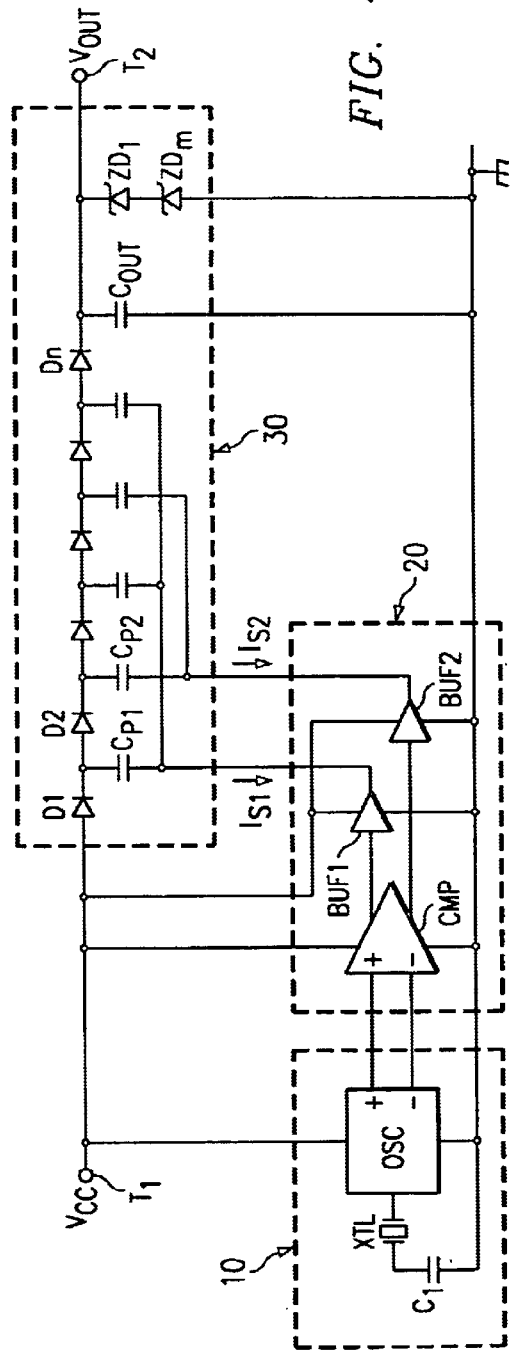
FIG. 4 is a circuit diagram showing an example configuration of a conventional voltage supply circuit.

FIG. 1 is a circuit diagram showing an embodiment of the voltage supply circuit pertaining to the present invention.

As illustrated, the voltage supply circuit of the present embodiment is configured with oscillator circuit 10, charge pump driver circuit 20a, and charge pump circuit 30.

Configurations and operations of the respective parts of the voltage supply circuit of the present embodiment will be explained below.

As illustrated, oscillator circuit 10 is configured with crystal oscillator XTL, capacitor C1, and oscillation amplifier OSC.

Charge pump driver circuit 20a is configured with comparators CMP1 and CMP2 and buffers BUF1 and BUF2 which supply driving currents $I_{S1}$ and $I_{S2}$ to charge pump circuit 30 according to the output signal of comparator CMP.

Charge pump circuit 30 is configured with multi-stage diodes D1, D2, ..., Dn connected in series between source voltage $V_{CC}$ supplying terminal $T_1$ and output terminal $T_2$, multiple capacitors $C_{p1}$, $C_{p2}$, ... provided to serve as a charge pump, output capacitor $C_{OUT}$, and multi-stage Zener diodes ZD1, ..., ZDm connected in series between output terminal $T_{OUT}$ and ground potential GND.

Capacitors $C_{p1}$, $C_{p2}$, ... for the charge pump are connected to output terminals of diodes D1, D2, ... at one end, and the other ends are connected to output terminals of buffers BUF1 and BUF2 alternately.

Figure 2:
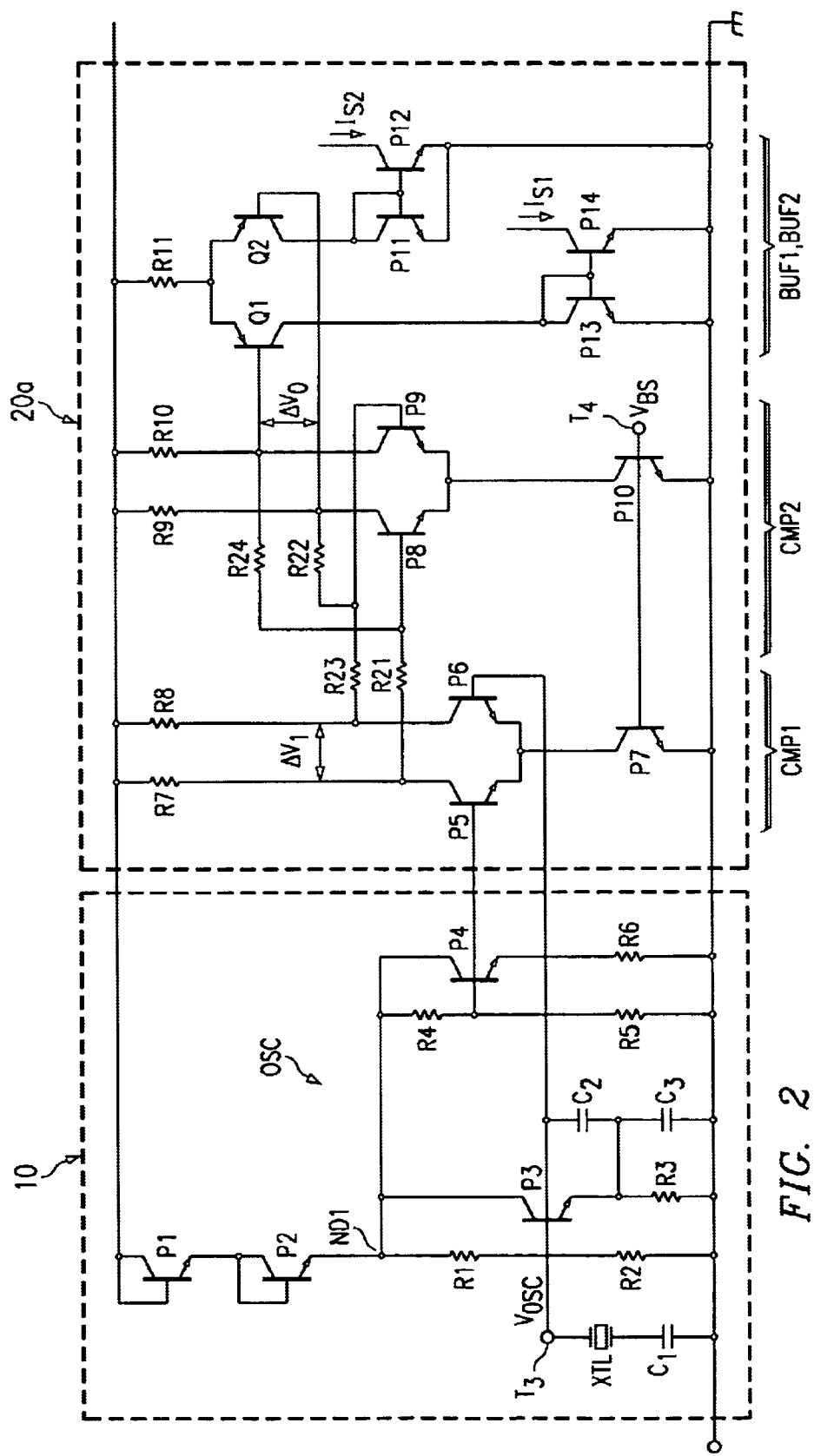
FIG. 2 is a circuit diagram showing the configurations of the oscillator circuit and charge pump driver circuit.

FIG. 2 is a circuit diagram showing the internal configurations of oscillator circuit 10 and charge pump driver circuit 20a.

As illustrated, oscillator circuit 10 is configured with crystal oscillator XTL, capacitor C1, and oscillation amplifier OSC, and oscillation amplifier OSC is further configured with npn transistors P3 and P4, capacitors C2 and C3, and resistor elements R1 through R6.

Crystal oscillator XTL and capacitor C1 are connected in series between oscillation signal output terminal $T_3$ and ground potential GND.

In addition, npn transistors P1 and P2 diode-connected between the feed line of source voltage $V_{CC}$ and node ND1 are connected in series.

In oscillation amplifier OSC, resistor elements R1 and R2 are connected in series between node ND1 and ground potential GND. The base of transistor P3 is connected to terminal $T_3$, its collector is connected to ND1, and the emitter is grounded via resistor element R3. In addition, capacitors C2 and C3 are connected in series between terminal $T_3$ and ground potential GND, and the junction of capacitors C2 and C3 is connected to the emitter of transistor P3.

Resistor elements R4 and R5 are connected in series between node ND1 and ground potential GND, the collector of transistor P4 is connected to node ND1, the base is connected to the junction of resistor elements R4 and R5, and the emitter is grounded via resistor element R6.

Oscillator circuit 10 with the configuration is oscillated at an oscillation frequency unique to crystal oscillator XTL, and oscillation voltage $V_{osc}$ is output from terminal $T_3$. In addition, the gain of said oscillator circuit is determined based on the capacitances of capacitors C2 and C3.

In charge pump driver circuit 20a, comparator CMP1 is configured with npn transistors P5, P6, and P7 and resistor elements R7 and R8. In addition, comparator CMP2 is configured with npn transistors P8, P9, and P10 and resistor elements R9, R10, R21, R22, R23, and R24. Furthermore, buffers BUF1 and BUF2 are configured with npn transistors P11, P12, P13, and P14, pnp transistors Q1 and Q2, and resistor element R11.

As shown in FIG. 2, first, in comparator CMP1, the base of transistor P5 is connected to the base of transistor P4 of oscillator circuit 10, and its collector is connected to the feed line of source voltage $V_{CC}$ via resistor element R7. In addition, the base of transistor P6 is connected to the base of transistor P3 of oscillator circuit 10, that is, terminal $T_3$, and its collector is connected to the feed line of source voltage $V_{CC}$ via resistor element R8. The emitters of transistors P5 and P6 are both connected to the collector of transistor P7. In addition, the emitter of transistor P7 is grounded, and its base is connected to input terminal $T_4$.

Furthermore, bias voltage $V_{bs}$ is applied to input terminal $T_4$. Transistor P7 serves as a current source for supplying an operating current regulated by bias voltage $V_{bs}$ to a differential circuit.

As described above, comparator CMP1 is configured with a differential circuit comprising transistors P5 and P6. In said differential circuit, the base voltage of transistor P4, that is, a reference voltage set by resistor elements R4 and R5 of oscillator circuit 10, is applied *to the base of transistor P5, and oscillation voltage $V_{OSC}$ generated by oscillator circuit 10 is applied to the base of transistor P6. Oscillation voltage $V_{OSC}$ and the base voltage of transistor P4 are compared by comparator CMP1, and differential voltages $\Delta V_i$ are output from the collectors of transistors P5 and P6 according to the result of said comparison.

Next, in comparator CMP2, the base of transistor P8 is connected via resistor element R21 to the collector of transistor P5 constituting comparator CMP1, and the base of transistor P9 is connected via resistor element R23 to the collector of transistor P6 constituting comparator CMP1. The collector of transistor P8 is connected to the feed line of source voltage $V_{CC}$ via resistor element R9 and to the base of transistor P9 via resistor element R22. The collector of transistor P9 is connected to the feed line of source voltage $V_{CC}$ via resistor element R10, and to the base of transistor P8 via resistor element R24.

The emitters of transistors P8 and P9 are connected in common to the collector of transistor P10. The emitter of transistor P10 is grounded, and its base is connected to terminal $T_4$. That is, like transistor P7 of comparator CMP1, transistor P10 serves a current source for supplying an operating current regulated by bias voltage $V_{bs}$ to the differential circuit comprising transistors P8 and P9.

In comparator CMP2, a hysteresis characteristic is given to the differential circuit by resistor elements R21, R22, R23, and R24. That is, the output of comparator CMP2 remains independent of output differential voltage $\Delta V_1$ of comparator CMP1 and is kept constant until output differential voltage $\Delta V_1$ of comparator CMP1 reaches a fixed value or higher.

Here, resistance values of resistor elements R21 and R23 are both denoted as r1, and resistance values of resistor elements R22 and R24 are both denoted as r2. In addition, assuming that the output differential voltage of comparator CMP2, that is, the voltage difference between transistors P8 and P9 constituting comparator CMP2, prior to the beginning of operation is denoted as $\Delta V_O$, comparator CMP2 begins to operate when the amplitude of output differential voltage $\Delta V_i$ of comparator CMP1 has exceeded value $\Delta V_{th}$ indicated by the following formula.

Mathematical Formula 1

$$\Delta V_{th} = -(r1/r2)\Delta V_O \qquad (1)$$

That is, comparator CMP2 does not operate when output differential voltage $\Delta V_1$ of comparator CMP1 is equal to or lower than threshold $\Delta V_{th}$ ($\Delta V_1 < \Delta V_{th}$). On the other hand, comparator CMP2 begins to operate when output differential voltage $\Delta V_i$ of comparator CMP1 has exceeded threshold $\Delta V_{th}$ ($\Delta V_1 \geq \Delta V_{th}$), and driving currents $I_{S1}$ and $I_{S2}$ having the frequency of oscillation voltage $V_{OSC}$ output from oscillator circuit 10 are output by buffers BUF1 and BUF2.

As described above, a hysteresis characteristic is given to comparator CMP2 through the provision of resistor elements R21, R22, R23, and R24, whereby the output of comparator CMP2 is sustained almost at a fixed level due to said hysteresis characteristic when output differential voltage $\Delta V_1$ of comparator CMP1 of the former stage is lower than threshold $\Delta V_{th}$ shown by Formula (1), comparator CMP2 operates when output differential voltage $\Delta V_1$ of comparator CMP1 has exceeded said threshold $\Delta V_{th}$, and output voltage $\Delta V_0$ is regulated according to the differential voltage $\Delta V_1$ input to the bases of transistors P8 and P9. As a result, driving currents $I_{S1}$ and $I_{S2}$ having the frequency of the oscillation frequency of oscillator circuit 10 are output by buffers BUF1 and BUF2.

Due to the provision of oscillator circuit 10 and charge pump driver circuit 20a, oscillation voltage $V_{OSC}$ having a resonant frequency unique to crystal oscillator XTL is generated by oscillator circuit 10 and output to charge pump driver circuit 20a. Differential voltage $\Delta V_i$ is output by charge pump driver circuit 20a according to oscillation voltage $V_{OSC}$. In comparator CMP2 having the hysteresis characteristic, the level of output voltage $\Delta V_O$ is kept constant when the amplitude of differential voltage $\Delta V_1$ input is equal to or lower than a fixed value, and output voltage $\Delta V_O$ having the same frequency as that of oscillation voltage $V_{OSC}$ is generated, as the differential circuit comprising transistors P8 and P9 operates, according to differential voltage $\Delta V_1$ when the amplitude of differential voltage $\Delta V_i$ has exceeded the fixed value.

In an output buffer, a differential circuit is configured with transistors Q1 and Q2 and resistor element R11. As illustrated, the base of transistor Q1 is connected to the collector of transistor P9, the base of transistor Q2 is connected to the collector of transistor P8, and the junction of the emitters of transistors Q1 and Q2 is connected to the feed line of source voltage $V_{CC}$ via resistor element R11. Transistor P13 is connected to the collector of transistor Q1, and transistor P11 is connected to the collector of transistor Q2.

Current mirrors are configured with transistors P11 and P12 and transistors P13 and P14, respectively. As illustrated, the bases of transistors P11 and P12 are connected along with the collector of transistor P11 to the collector of transistor Q2. The emitters of transistors P11 and P12 are grounded. Similarly, the bases of transistors P13 and P14 are connected along with the collector of transistor P13 to the collector of transistor Q1. The emitters of transistors P13 and P14 are grounded.

In the output buffer configured in the manner, driving current $I_{S1}$ corresponding to the current which flows in the collector of transistor Q1 is output from the collector of transistor P14, and driving current $I_{S2}$ corresponding to the current which flows in the collector of transistor Q2 is output from the collector of transistor P12.

Figure 3A:
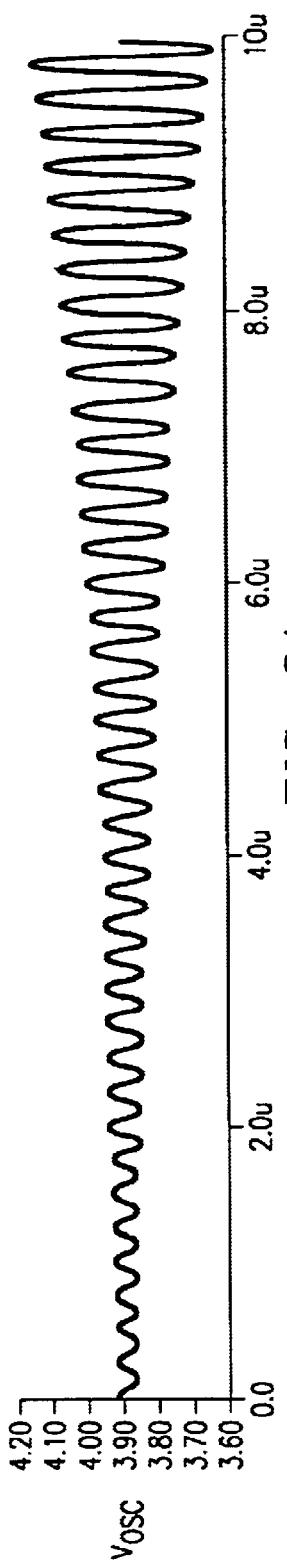
FIG. 3 are waveform diagrams showing the operations of the oscillator circuit and the charge pump driver circuit.
Figure 3B:
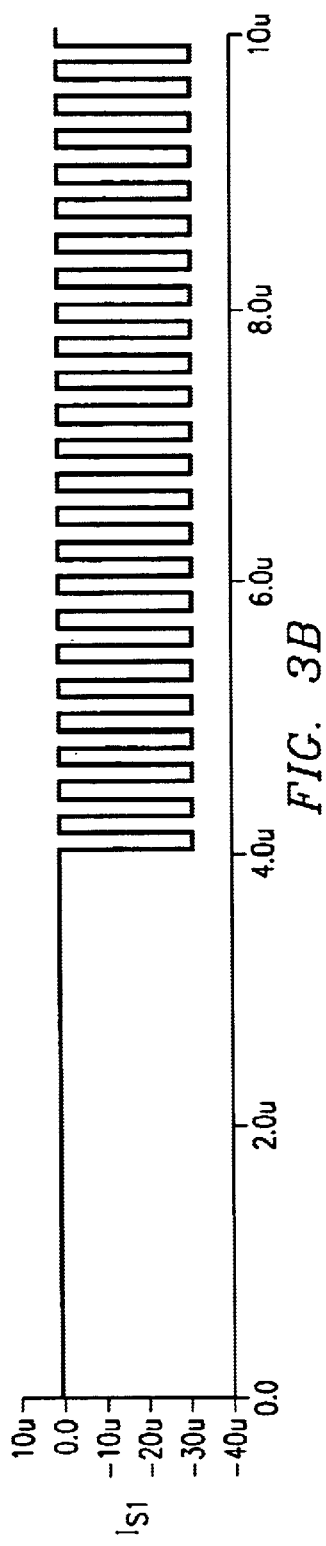
Figure 3C:
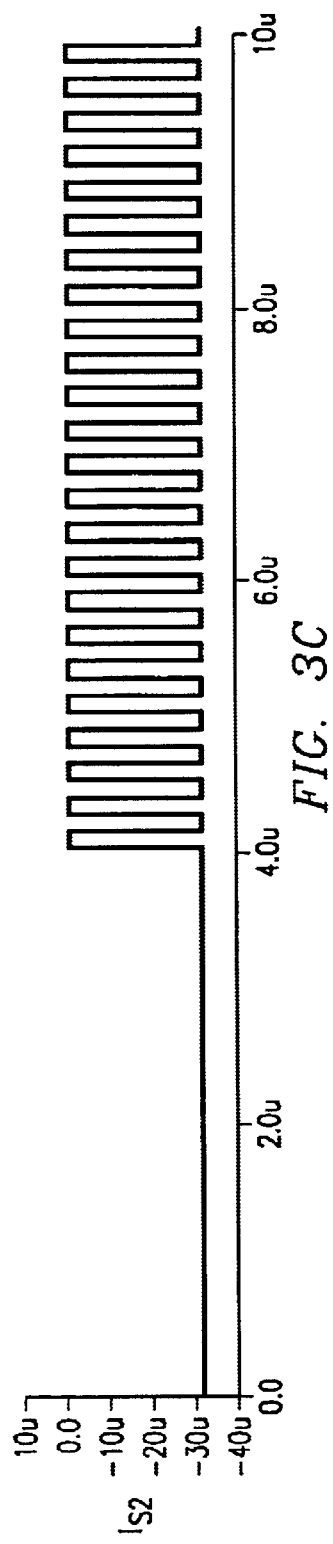
Figure 5:
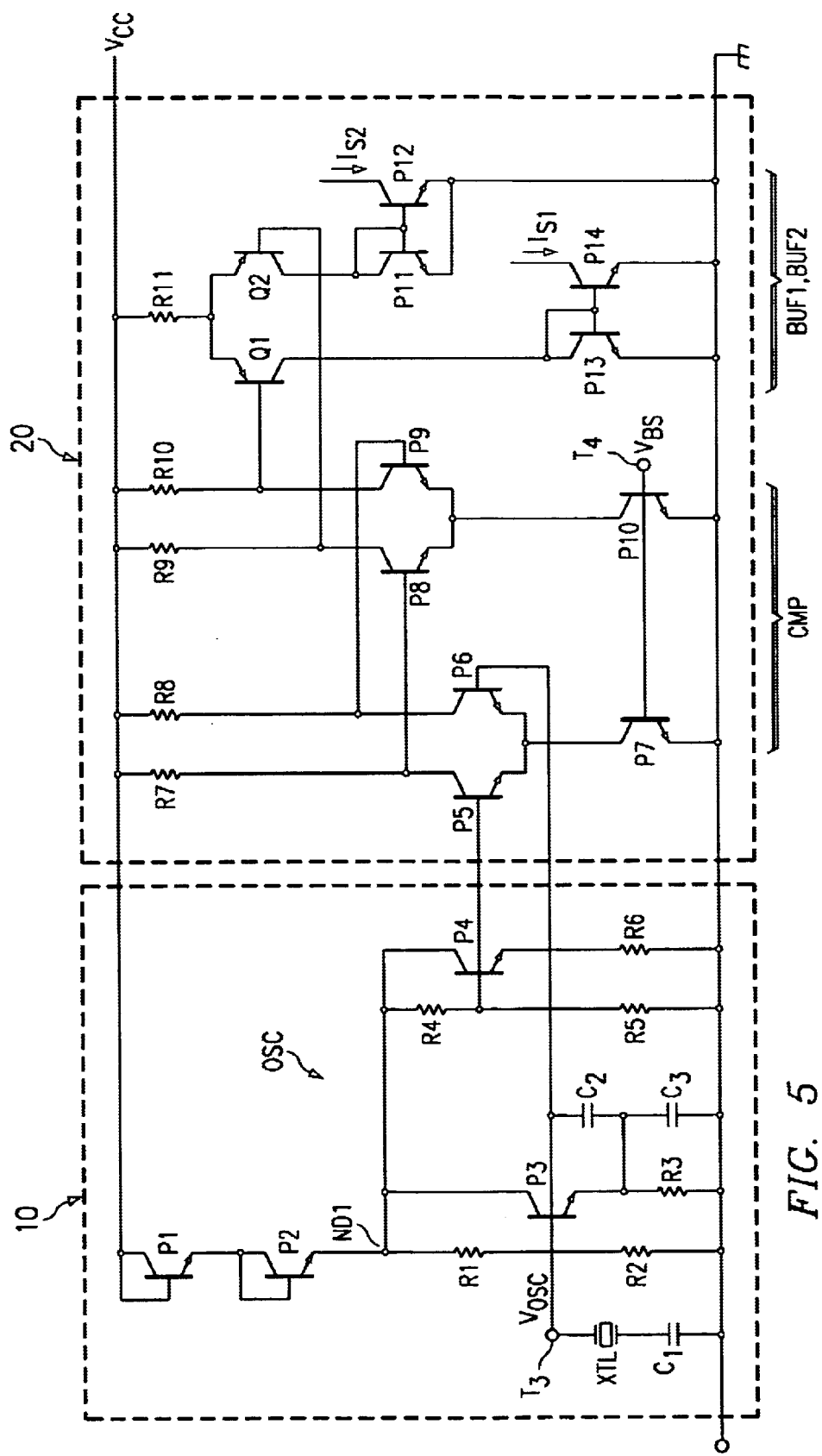
FIG. 5 is a circuit diagram showing the configurations of the oscillator circuit and the charge pump driver circuit constituting the conventional voltage supply circuit.

FIG. 3 presents waveform diagrams showing the waveforms of oscillation voltage $V_{OSC}$ of oscillator circuit 10 and driving currents $I_{S1}$ and $I_{S2}$ output by charge pump driver circuit 20a. Here, FIG. 3 shows the signal waveforms after source voltage $V_{CC}$ is applied until oscillator circuit 10 and charge pump driver circuit 20a begin to operate normally.

FIG. 3(a) shows the waveform of oscillation voltage $V_{OSC}$. As illustrated, after source voltage $V_{CC}$ is applied, the amplitude of oscillation voltage $V_{OSC}$ increases gradually at oscillator circuit 10. On the other hand, charge pump driver circuit 20a does not begin to operate until the amplitude of oscillation voltage $V_{OSC}$ reaches a prescribed value due to the hysteresis characteristic of comparator CMP2, and driving currents $I_{S1}$ and $I_{S2}$ output are kept at prescribed values, respectively. Once the amplitude of oscillation voltage $V_{OSC}$ reaches the prescribed value, charge pump driver circuit 20a begins to operate, and driving currents $I_{S1}$ and $I_{S2}$ having the same frequency as that of oscillation voltage $V_{OSC}$ are output, respectively.

At charge pump circuit 30, because capacitors $C_{p1}$, $C_{p2}$, . . . are charged and discharged alternately repeatedly according to driving currents $I_{S1}$ and $I_{S2}$ supplied from charge pump driver circuit 20a, boosting voltage $V_{OUT}$ boosted higher than source voltage $V_{CC}$ is output from output terminal $T_2$.

As described above, when charge pump driver circuit 20a is provided with comparator CMP2 having the hysteresis characteristic, output voltage $\Delta V_O$ of comparator CMP2 is kept at a fixed level until the amplitude of oscillation voltage $V_{OSC}$ of oscillator circuit 10 reaches a prescribed level, that is, until the amplitude of output differential voltage $\Delta V_1$ of comparator CMP1 reaches a prescribed level. As a result, a dead-zone is created in the parasitic oscillation loop, so that parasitic oscillation can be restrained.

As explained above, in the present embodiment, oscillator circuit 10 generates oscillation voltage $V_{OSC}$ having an oscillation frequency unique to the crystal oscillator and outputs it to charge pump circuit 20a. Charge pump circuit 20a is provided with comparator CMP2 having the hysteresis characteristic, whereby comparator CMP2 does not operate when output differential voltage $\Delta V_i$ of comparator CMP1 is lower than prescribed threshold $\Delta V_{th}$, comparator CMP2 begins to operate when output differential voltage $\Delta V_1$ of comparator CMP1 has exceeded threshold $\Delta V_{th}$, and driving currents $I_{S1}$ and $I_{S2}$ having the same frequency as that of the oscillation signal output from oscillator circuit 10 are generated and supplied to charge pump circuit 30. As a result, parasitic oscillation can be restrained, and a stable supply of driving currents to the charge pump circuit can be assured using a simple circuit configuration.

As explained above, with the charge pump booster circuit of the present invention, parasitic oscillation of the charge pump circuit can be restrained, driving currents having a stable oscillation frequency can be supplied to the charge pump circuit, and a desired boosted voltage can be supplied to the load.

In addition, with the present invention, there is no particular need to take the effect of the input impedance of the power source provided to the present voltage supply circuit into consideration, parasitic oscillation can be restrained using a simple circuit configuration, and simplification of the circuit configuration and reduction of cost can be realized.

Furthermore, the present invention is advantageous in that parasitic oscillation can be restrained by providing the charge pump driver circuit with a comparator having a hysteresis characteristic, the hysteresis characteristic can be realized easily using resistor elements, the circuit characteristic can be stabilized, and a desired operating characteristic can be realized.

What is claimed is:

1. A voltage supply circuit provided with an oscillator circuit which outputs an oscillation signal having a prescribed frequency, a first comparator circuit which compares the oscillation signal with a prescribed reference signal and outputs a signal in accordance with the result of the comparison, a second comparator which sustains its output at a prescribed level when the amplitude of the output signal of the first comparator circuit is lower than a prescribed value and outputs a signal in accordance with the output signal of the first comparator circuit when the output signal of the first comparator circuit has exceeded the reference value, a buffer circuit which outputs a first driving current and a second driving current having inverted phases with respect to each other according to the output signal of the second comparator circuit, and a charge pump circuit having multiple capacitors to be charged alternately by the first and second driving currents and which outputs a voltage different from a source voltage.

2. The voltage supply circuit described in claim 1, wherein the oscillator circuit has a crystal oscillator for generating the oscillation signal at a frequency unique to the crystal oscillator, and outputs it to the first comparator circuit.

3. The voltage supply circuit described in claim 1, wherein the first comparator circuit is configured with a differential circuit in which the oscillation signal is input to an input terminal provided on one side, and the reference signal is input to an input terminal provided on the other side.

4. The voltage supply circuit described in claim 1, wherein the second comparator circuit is configured with a differential circuit having a hysteresis characteristic.

5. The voltage supply circuit described in claim 2, wherein the first comparator circuit is configured with a differential circuit in which the oscillation signal is input to an input terminal provided on one side, and the reference signal is input to an input terminal provided on the other side.

6. The voltage supply circuit described in claim 2, wherein the second comparator circuit is configured with a differential circuit having a hysteresis characteristic.

7. The voltage supply circuit described in claim 3, wherein the second comparator circuit is configured with a differential circuit having a hysteresis characteristic.

\* \* \* \* \*